Patented Mar. 3, 1931

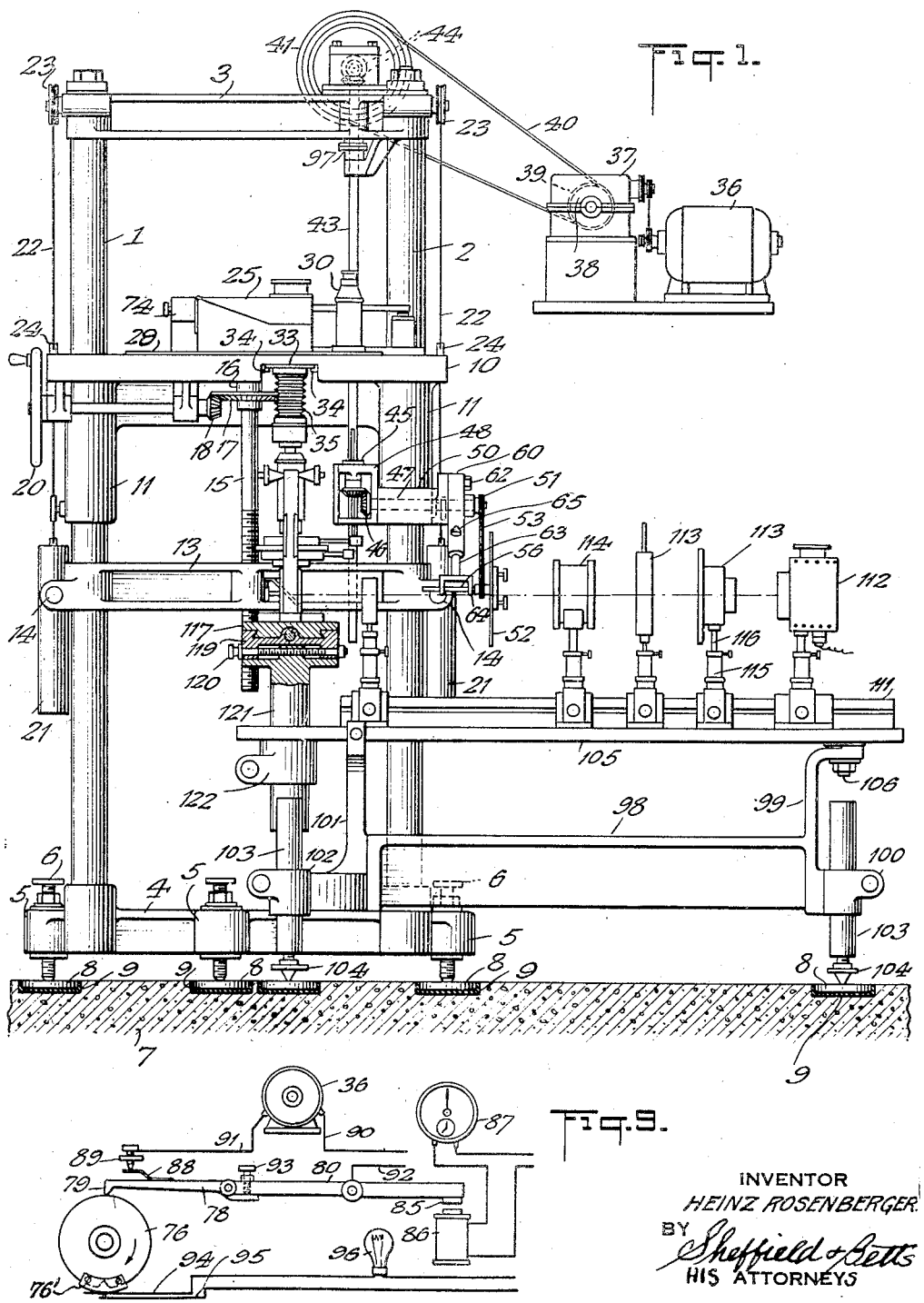

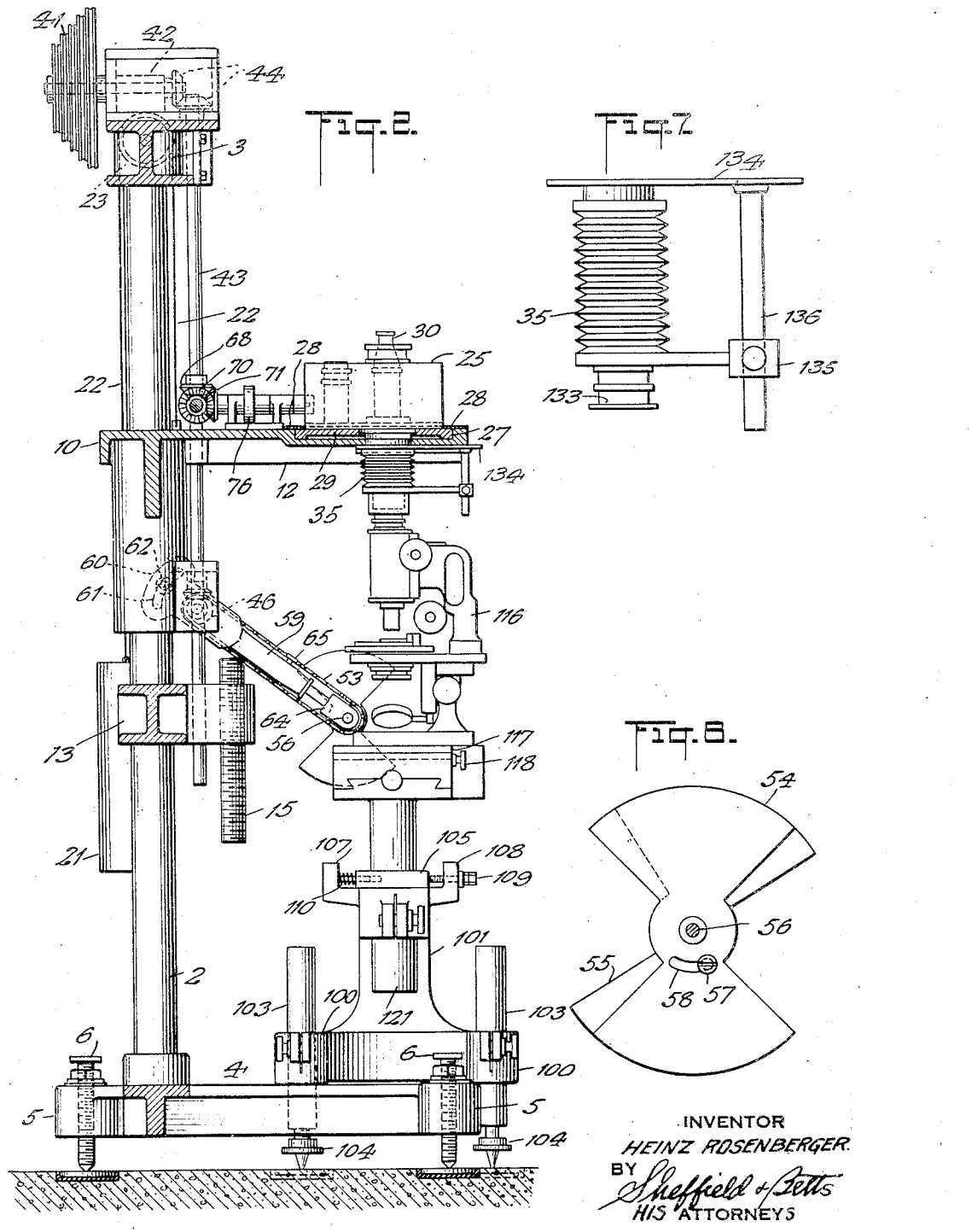

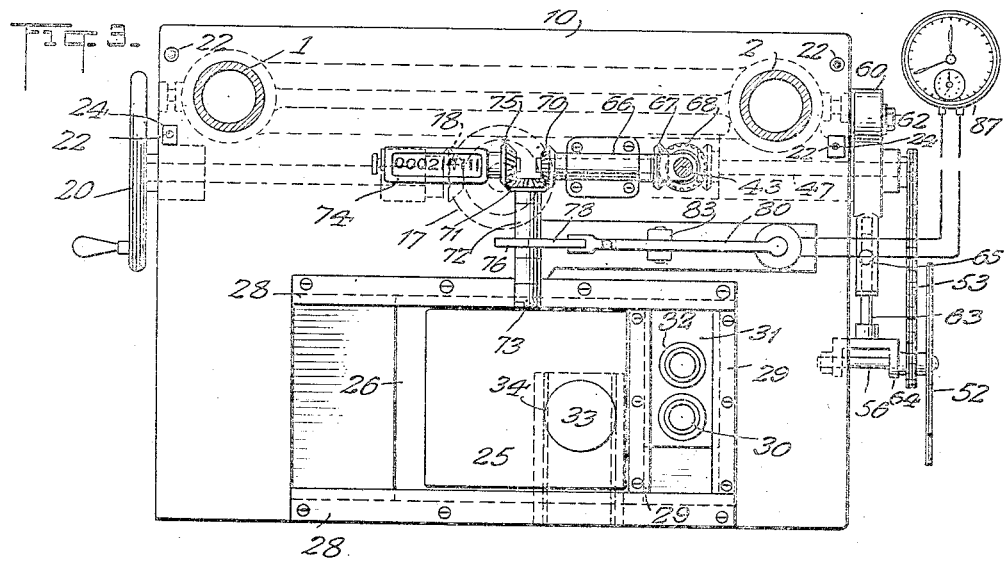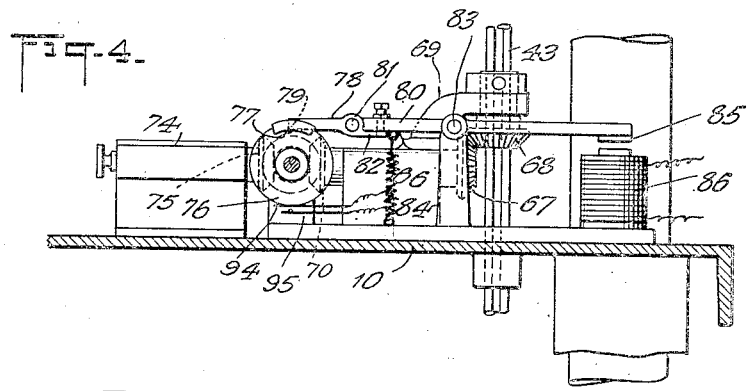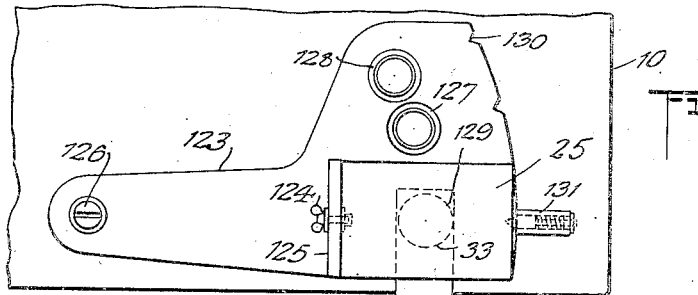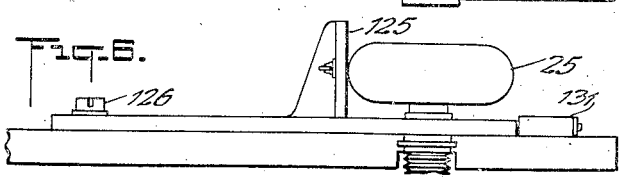

1,794,499

UNITED STATES PATENT OFFICE

HEINZ ROSENBERGER, OF NEW YORK, N. Y.

MICROCINEMATOGRAPHIC APPARATUS

Application filed April 9, 1929. Serial No. 353,762.

The invention relates, in general, to an improved form of apparatus for making cinematographic records of microscopic phenomena. The apparatus is readily adapted to make photographic records of various actions which take place very slowly, such as, for example, the growth of plants, which actions it may or it may not be necessary to observe under the microscope.

In the making of micro-cinematographic records photographs are taken at intervals which may vary from a few seconds, more or less, to several minutes, depending upon the phenomena being studied. These photographs are then projected on a screen at the usual projection rate of 16 per second so that the actions of microscopic objects which occurred so slowly that they could not be observed by the naked eye of the observer, are accelerated to such an extent that the entire phenomena of the action which may have taken several days may be observed in a few minutes.

In general, the making of micro-cinematographic records comprises, placing the substance to be investigated on the observation platform of a suitable microscope, positioning a camera above the microscope at such a distance that the film in the camera is in the projection cane of the microscope and then causing an intense white light to illuminate the substance under investigation at the desired intervals. When these intervals are rather long, as for example, several minutes, it is desirable to turn the light off when no photographs are being made. When these intervals are short, it is more convenient to have the light on continuously and to interpose a revolving shutter between the source of light and the microscope to illuminate the substance under observation only when a photograph is to be made. During the interval between the taking of two successive photographs the film is moved into position for the next exposure. During the short space of time in which each photograph is being made, that is, while the light is on, the film is stationary. Such cooperation between the movement of the film and the illumination of the substance under investigation, requires the film movement to be accurately synchronized with the control of the illumination.

The principal object of the present invention is to provide an improved form of apparatus for the making of micro-cinematographic records.

It will be readily appreciated by one skilled in the art that when it is necessary to magnify very greatly the substance under investigation, it is important to prevent the apparatus from vibrating which would cause the photographs to be blurred and indistinct.

Thus an object of the present invention is to provide camera-supporting apparatus of such construction that it is free from objectionable vibration and to provide an optical bench for supporting the source of light and the microscope which bench is not mechanically connected to the camera support so that there is no possibility of vibration being transferred to the optical bench from the operating mechanism of the apparatus associated with the camera support.

A further object of the invention is to provide an apparatus of such design that it may be conveniently and readily adjusted for the making of micro-cinematographic records of various substances.

Further objects of the invention will be apparent from the following description and the invention will be better understood therefrom when taken in conjunction with the accompanying drawings, in which;

Fig. 1 is a front view of a preferred embodiment of the present invention showing the apparatus in operative position.

Fig. 2 is a left side elevational view of the apparatus shown in Fig. 1.

Fig. 3 is a plan view of the camera table showing the mechanism preferably employed to position the film for successive photographs and to hold the film stationary while a photograph is being taken;

Fig. 4 is a partial detail view of the mechanism referred to in the preceding paragraph;

Figs. 5 and 6 illustrate respectively, plan and side elevation of a modified form of camera support;

Fig. 7 is a partial sectional view of a bellows which is adapted to be associated with the camera when photographing objects of such size that it is not necessary to employ a microscope;

Fig. 8 illustrates a preferred form of revolving shutter provided with adjustible sectors for controlling the period of illumination of the substance under investigation, and Fig. 9 is a diagrammatical representation of a preferred arrangement for timing the movement of the film in the camera and for turning the light on an off.

For convenience of description, the preferred embodiment of the present invention may be said to comprise two separate elements, (1) the camera unit, and (2) the optical bench. The camera unit comprises suitable supporting means for the camera and also for the driving mechanism of the apparatus while the optical bench comprises supporting means for the source of light and its accessories and also means for supporting the microscope. The camera unit is made of sufficiently heavy construction so that the operating mechanism associated therewith will not cause objectionable vibration of the camera. When working with high magnifications it is essential that there be no vibration of the apparatus otherwise the photographs taken would be blurred and indistinct. Since the camera unit and the optical bench are not rigidly connected together but are entirely separated mechanically and have no direct connection as will be described, no vibration, however slight, will be transferred from the camera unit to the optical bench. This division of the apparatus into two separate units permits each unit to be adjusted entirely independently of the other unit and affords more convenient manipulation of the apparatus.

In the preferred embodiment of the invention illustrated in the accompanying drawings, the numerals 1 and 2 indicate two vertical standards adapted to support the camera table and its associated apparatus. These standards are preferably at such height that the camera table mounted thereon may be positioned at a height convenient to the operator of the apparatus. The standards are preferably of circular cross section and are connected together at their upper ends by a cross bar 3 which may be of any suitable cross section such as for example the I section shown. The lower ends of the standards 1 and 2 are mounted upon a T-shaped foot piece 4. The ends of the standards are inserted in suitable bosses formed integral with the cross bar of the foot piece 4. The three extremities of the foot piece 4 are provided with bosses 5 which have associated therewith the adjusting screws 6, by means of which the standards 1 and 2 may be placed in vertical position when the floor upon which the apparatus is mounted is not level. In order to prevent vibration of the floor 7 from being transferred to the camera unit, the lower ends of the adjusting screws rests upon metallic blocks 8 which are inserted in rubber pads 9 embedded in or on the floor.

The camera is supported upon a camera table 10 which has preferably formed integral therewith the elongated collars 11 through which the standards 1 and 2 pass. The table 10 projects a substantial distance from the standards 1 and 2 as will be observed more clearly in Fig. 2 and is provided with supporting ribs 12 in order to provide rigidity.

As it is necessary to raise and lower the camera from various set-ups of the apparatus, the following mechanism is provided for this purpose. An intermediate transverse member 13 is positioned below the camera table 10 and is clamped to the standards 1 and 2 by means of the locking bolts 14. A vertical rod 15 is threaded in the transverse member 13 as will be seen in Fig. 1 and is inserted in a suitable boss 16 on the underside of the camera table 10. The rod 15 is free to rotate in the boss 16 but rotation of the rod will cause the camera table 10 to be raised or lowered depending upon the direction of rotation. The rod 15 is rotated through the medium of suitable gears 17 and 18 mounted respectively on the rod 15 and the horizontal rod 19. A suitable handle 20 is provided on the end of the rod 19 for the purpose of turning the same to raise or lower the camera table in the manner described. In order to assist the raising of the camera table and to prevent its being lowered by the action of gravity counter weights 21 are provided and are connected to the camera table by the cables 22 which pass over the pulleys 23 mounted on the upper ends of the standards 1 and 2 as illustrated in Fig. 1. The ends of the cables 22 are connected to the camera table as indicated at 24.

The camera 25 which is employed in the taking of the photographs may be an ordinary commercial type of camera but is preferably of comparatively small height for convenience of focusing control. The camera 25 is securely fastened to a camera plate 26 which projects beyond the right hand face of the camera as illustrated in Fig. 3. The camera slides longitudinally of the camera table 10 in the groove 27 shown more clearly in Fig. 2. The camera plate 26 is preferably of slightly greater width than the camera so that its longitudinal sides projects slightly beyond the sides of the camera whereby the camera may be held on the table by the guide strips 28 which may be screwed on the camera table as shown and which lie over the projecting longitudinal sides of the camera plate 26 as more clearly illustrated in Figs. 2 and 3. The right hand end of the camera plate 26 is provided with transverse strips 29 screwed thereto and of slightly less length than the distance between the guide strips 28. An observation piece 30 is mounted upon a plate 31 which slides between the guide strips 29 and through which the substance under investigation may be observed for the purpose of focusing. A focusing piece 32 having a ground glass plate therein is also mounted upon the sliding plate 31.

The camera table 10 has a hole 33 therein which is in alignment with the center line of the microscope and through which the light passes to the film in the camera. It will be understood from the mounting of the camera and the observation and focusing pieces described above that by sliding the camera plate 26 longitudinally of the camera table either the camera or these pieces may be positioned in alignment with the hole 33. When taking photographs the camera 25 is placed over the hole 33 so that the lens of the camera is in alignment therewith. When it is desired to observe the substance under investigation by the eye particularly for the purpose of focusing, the camera is moved to the left so that either the observation piece 30 or the focusing piece 32 may be placed in alignment with the hole 33. The ground glass in the focusing piece 32 is at the same level as the film in the camera so that when the image is in proper focus on the ground glass, it will be in proper focus on the camera film.

Referring now to Figs. 1 and 3, it will be observed that the underside of the camera table 10 is provided with transverse guide strips 34 which extend slightly beyond the hole 33 in the camera plate. These guide strips are adapted to support bellows or an adjustable member 35 which connects at its upper end with the camera table and at its lower end with the top of the microscope as shown in Figs. 1 and 2. The purpose of the adjustable member is to exclude light from the film except that which comes up through the microscope. This adjustable member is preferably made up of bellows as shown or of adjustable parts which telescope one within the other so that the same member may be used for various positions of the camera table above the top of the microscope. The lower end of this member encircles the upper end of the microscope and forms a light proof connection between the camera unit and the optical bench and there is no likelihood of objectionable vibration being transmitted from the camera unit to the optical bench.

The mechanism employed to move the camera film and to rotate the revolving shutter which is employed in the case of taking photographs at short intervals will now be described. Power is supplied to the apparatus preferably by means of a small electric motor 36 and is transmitted through a worm 37 to a worm wheel 38 which is directly connected to a series of driving pulleys 39. Power is transmitted from the driving pulleys 39 by means of a belt 40 to the driven pulleys 41. The pulleys 39 and 41 are graduated in size so that the speed of the driving mechanism may be varied while the speed of the motor 36 remains constant. It will, of course, be understood that the particular means for supplying power to the driving mechanism may be varied according to the wishes of the operator as for example, the driven pulleys 41 may be directly connected to a driving motor thereby omitting the worm and worm wheel and the other driving mechanism shown.

Referring now to Fig. 2, it will be seen that the pulleys 41 are mounted on a horizontal shaft 42 which transmits power to the vertical shaft 43 through the medium of the bevel gears 44.

Referring to Fig. 1, it will be seen that the vertical shaft 43 passes through the camera table 10 and extends a substantial distance therebelow. A bevel gear 45 is slidably mounted on the vertical shaft 43 and engages with the bevel gear 46 which is mounted on the end of the horizontal shaft 47. The bevel gear 45 is supported in the bracket 48 which projects from the inside of the collar 11. Since the bracket 48 is an integral part of the collar 11 and the bevel gear 45 is raised and lowered with the camera table 10, it is necessary to provide a keyway 49 in the vertical shaft 43 whereby power may be transmitted from this shaft to the bevel gear 45 and at the same time, the camera table may be raised or lowered. The horizontal shaft 47 is carried by the bracket member 50 which is also formed integral with the collar 11. On the end of the horizontal shaft 47, a small pulley 51 is provided. This pulley is connected to the revolving shutter 52 by means of a sprocket chain 53. Since it is necessary to synchronize the rotation of the revolving shutter 52 with the movement of the film in the camera, it is necessary to employ some device which obviates slipping between the revolving shutter and the horizontal shaft 47, such as for example, the sprocket chain 53 referred to above.

Referring to Fig. 8, it will be observed that the revolving shutter 52 comprises two diametrically opposite sectors 54 having associated therewith two diametrically opposite sectors 55 which are mounted on the shutter shaft 56 and are provided with a bolt 57 extending through the slot 58 in the sectors 54. By sliding the bolt 57 in the slot 58 the position of the adjustable sectors 55 will be varied with respect to the sectors 54 thereby changing the angular opening between the adjacent radial edges of the two sets of sectors thus increasing or decreasing the period in which light may pass through the revolving shutter.

Since the horizontal shaft 47 is mounted in the bracket 50 formed integral with the camera table, it is necessary to provide means whereby the table may be raised or lowered without removing the revolving shutter from the path of light from the source of illumination to the microscope. These means comprise a pivoted arm 59 shown more clearly in Fig. 2. This arm is pivoted about the horizontal shaft 47 and its upper end is provided with an enlarged portion 60 having a slot 61 therein. A clamping bolt 62 is positioned in the slot 61 and screwed into the collar 11. The pivoted arm 59 may therefore be placed in various angular positions and held securely in place by tightening the clamping bolt 62. The length of the pivoted arm is adjusted through the medium of a slidable member 63 having at its lower end two spaced bearings 64 for supporting the revolving shutter shaft 56 and having its upper end telescoped into the pivoted arm 59, as indicated in the dotted lines in Fig. 3. A clamping screw 65 is provided to hold the slidable member 63 in position.

In the operation of this apparatus, the film in the camera 25 is held stationary while a photograph is being made and is moved from one exposure to the next during the interval in which the source of illumination is turned off or when the revolving shutter 52 prevents light from coming to the microscope.

The mechanism for thus operating the camera will now be described. The source of power for operating the camera is obtained from the main vertical driving shaft 43 and the apparatus is mounted upon the camera table as shown more clearly in Fig. 3 and comprises a transverse shaft 66 having a bevel gear 67 engaging with the bevel gear 68 on the vertical shaft 43. As the camera table 10 moves vertically, it is necessary to support the bevel gears 68 independently of the shaft 43. This is done by supporting the gear 68 in a suitable bracket 69, (see Fig. 4) extending upward from the support 70 in which the horizontal shaft 66 rotates. Power is transmitted from the shaft 66 through the bevel gears 70 and 71 to the camera shaft 72. The end of this shaft is provided with a projection 73 as shown, which engages with the camera in such a way as to move the film when the shaft is rotated. In order to keep a visual record of the number of pictures taken a counter 74 is connected to the camera shaft 72 through the bevel gears 71 and 75.

As pointed out above, the film is stationary while a photograph is being taken. One means for holding the film stationary is clearly illustrated in Fig. 4 and comprises a cam 76 mounted on the camera shaft 72 and having cut therein a notch 77. A cam follower 78 is provided with a tooth 79 which is adapted to engage in the cam notch 77. This cam follower is pivotally mounted between the bifurcated ends (see Fig. 3) of a lever 80 and is supported by a pin 81 extending through the bifurcated ends of the lever 80. The underside of the follower 78 is provided with a projecting lip 82 which contacts with the underside of the lever 80. This lever is pivotally mounted on a pin 83 supported by the standards 84 mounted on the surface of the camera table. It will be understood that when the tooth 79 on the follower 78 lies in the notch 77 in the cam, the film will be prevented from moving, while when the tooth 79 rides on the periphery of the cam 76, the film may be moved. The mechanism is so arranged that one revolution of the cam 76 is equivalent to the position of the film in the camera from one dark intermission to the next between which the exposure is made.

Referring now more particularly to Fig. 9, the timing operation of the apparatus will be described, reference being made to a source of illumination which it will be understood is the source of light for the microscope. The right hand end of the lever 80 is provided with a contact 85 which is positioned over an electric magnet 86. The flow of electric current through this magnet is controlled by means of a clock 87 which may be set so as to give electric impulses to the magnet 86 at any desired interval, it being understood that the intervals will be selected according to the nature of the phenomenon under investigation. When the magnet is energized it causes the right hand end of the lever 80 to be depressed thus raising the tooth 79 of the cam follower 78 out of the groove 76 in the cam whereby the cam is free to rotate. When this action occurs, the circuit of the driving motor 36 is closed in the following manner. A contact member 88 is mounted on the upper side of the cam follower 78 as shown in Fig. 4 and comes into contact with the terminal 89. The circuit of the driving motor is traced as follows, starting at the positive terminal indicated, through the conductor 90 to the driving motor 36 thence through the conductor 91 to the terminal 89 to the contact member 88 through the cam follower 78 and the lever 80 and thence through the conductor 92 to the negative terminal indicated. A thumb screw 93 is provided at the left hand extremity of the lever 80 and extends therethrough and is in alignment with the projecting lip 82 on the cam follower 78. When this thumb screw is caused to project below the under surface of the lever 80, it causes the lip 82 to be depressed thus raising the left hand end of the cam follower 78 so that the contact member 88 is in contact with the terminals 89. The circuit through the driving motor 86 is thus closed and since the tooth 79 of the cam follower is raised from the notch 77 in the cam the film in the camera may be moved continuously.

The cam 76 has mounted on one of its faces an arcuate member 76' which projects slightly beyond the outer periphery of the cam and lies adjacent the notch 77. During a portion of the rotation of the cam this member is adapted to move the contact member 94 into contact with the member 95 thus closing the circuit through the source of illumination as will be seen by referring to Fig. 9. A spring such as is shown in Fig. 4 is preferably connected to the left hand end of the lever 80 to keep the cam follower in contact with the cam except when the magnet is energized.

It will be understood that when the circuit is broken through the driving motor 36, this motor will rotate for a short interval of time thereafter but the cam 76 is prevented from rotating by the tooth 79 lying in the notch 77. It, therefore, becomes necessary to provide a slip clutch to absorb these residual rotations of the driving motor and to prevent destruction of the driving apparatus. Such a slip clutch is illustrated at 97 in Fig. 1 and since it may be of any suitable construction, it need not be described in detail.

The other of the units of the preferred form of this invention is the optical bench which supports the source of light and its accessories and also supports the microscope. A preferred form of optical bench is clearly illustrated in Figs. 1 and 2 to which reference is now made. The under structure of the bench comprises a longitudinal member 98 having formed integral at its right hand end a bracket member 99, the lower end of which has formed integral therewith two spaced clamping elements 100. The left hand end of the member 98 has formed integral therewith a bracket 101 which has associated therewith a single, central, clamping element 102. The clamping elements referred to above are adapted to support adjustable legs 103 having at their lower ends the threaded members 104 which permits fine adjustments of height to be made. These members are positioned upon the blocks 8 carried on the rubber pads 9 located on the floor as described above. It will be readily understood that this arrangement of the adjustable legs 103 and the members 104 permit easy regulation and adjustment of the height of the optical bench.

The top 105 of the optical bench is pivotally mounted on the bracket 99 by means of the pin 106 as shown in Fig. 1.

Referring now more particularly to Fig. 2, it will be seen that the other end of the optical bench top 105 is supported in the bracket 101 between the two spaced projections 107 and 108. An adjusting screw 109 extends through the projection 108 and abuts against the lateral edge of the bench top 105 as illustrated. A spring 110 lies within a suitable recess in the bench top 105 and abuts against the face of the projection 107. Turning of the adjustment screw 109 causes the bench top 105 to swing about its pivot point 106 thus permitting the microscope which is mounted as hereinafter described on the left hand end of the bench top to be adjusted with respect to the film in the camera.

An elongated member 111 of substantially triangular cross section is mounted on the bench top 105 and is adapted to support the source of light and its accessories. The source of light 112 and the condensers and the filter condenser 114 are supported by riders 115 which are adjustable longitudinally of the member 111. The riders are provided with adjustable members 116 whereby the height of the source of light and condensers may be varied.

Where the photographs are taken at comparatively long intervals, that is, one exposure every two or more seconds an incandescent lamp may be used as the source of illumination. As this lamp will be turned on and off by the making and breaking of its circuit as described above, it is not necessary to employ the revolving shutter. Where the intervals are shorter than that referred to above, a high intensity arc lamp may be employed and is preferably burned continuously so that it is necessary to employ the revolving shutter to interrupt the beam of light.

Referring to Figs. 1 and 2, it will be seen that the microscope 116 may comprise any desirable commercial form of instrument which is mounted upon the upper element 117 of a compound slide. This upper element of the compound slide moves transversely with respect to the optical bench by the turning of a thumb screw 118, while the lower element 119 of the compound slide moves longitudinally with respect to the optical bench by rotation of the screw 120. The position of the microscope may therefore be varied with great accuracy by the combined adjustment of these two slides. As will be seen from the drawings, the upper element of the compound slide is mounted in a dovetailed connection with the lower element and the lower element is mounted in dovetailed connection with the upper end of a standard 121 which projects through the bench top 105 and is held at a fixed height with respect thereto by means of the clamping element 122.

In the modification shown in Figs. 5 and 6 a slightly different manner of mounting the camera is illustrated. In this case, the camera 25 is mounted upon a modified form of sector 123 being fixed in position thereon by means of the wing nut 124 associated with a bracket 125 on the sector. Instead of sliding the camera longitudinally or transversely of the camera table, the sector 123 is pivoted on the camera table as indicated at 126. The observation piece 127 and the focusing piece 128 are mounted on the sector 123 at the same distance from the pivot point 126 as is the film in the camera. The sector 123 may be rotated about the pivot point 126 so that the camera, observation piece or focusing piece may be positioned over the hole 33 in the camera table. To assist in the positioning of these various members accurately over the hole 33, the outer periphery of the sector is notched as indicated at 130 into which notches the latch 131 is adapted to be positioned when in alignment therewith.

In the investigation of the phenomena which are of such size that the changes therein may be observed and photographed without the necessity of employing a microscope, the apparatus illustrated in Fig. 7 is employed. This apparatus comprises the bellows 35 which is supported from the underside of the camera table 10 and which is provided with an objective lens 133 through which the substance to be investigated is photographed and has associated therewith a support (not shown) on which the object to be photographed is placed. During focusing the length of the bellows is adjusted by moving the clamping block 135 along the supporting rod 136.

Instead of positioning a bellows between the microscope and the camera table, it may be desired to use a "beam-splitter" or other observation means whereby the object under investigation may be observed while being photographed, or, any other desired accessory may be substituted in the place of the bellows.

Having thus illustrated and described the specific embodiment of my invention, it is not to be understood as being limited to the details set forth for the construction and arrangement of parts may be altered as the occasion requires or the construction of the apparatus may be otherwise modified by those skilled in the art without departing from the spirit and scope of the invention as set forth in the appended claims.

What is claimed and desired to be protected by Letters Patent is:

1. In micro-cinematographic apparatus, a camera, observation and focusing pieces associated with said camera and mounted therewith on a movable member, a unit adapted to support said member at various heights, an optical bench adapted to support a microscope and a source of illumination therefor, said member being movable so that either of said pieces or the camera may be positioned over the microscope, and mechanism for illuminating the microscope at predetermined intervals, said optical bench being mechanically isolated from the camera unit to prevent the transfer of vibrations.

2. In micro-cinematographic apparatus, a camera, a table adapted to support said camera, a unit adapted to support said table at various heights, an optical bench adapted to support a microscope and a source of illumination therefor, mechanism mounted on said table for moving the camera film and synchronously illuminating the microscope at predetermined intervals, said mechanism being adjustable to permit the height of the camera table to be varied, and said optical bench being mechanically isolated from the camera unit to prevent the transfer of vibrations.

3. In micro-cinematographic apparatus, a camera, observation and focusing pieces associated with said camera and mounted therewith on a movable member, said member being mounted on a camera table, a unit adapted to support said table at various heights, an optical bench adapted to support a miscroscope and a source of illumination therefor, said member being movable on said table so that either of said pieces or the camera may be positioned over the microscope, and mechanism mounted on said table for moving the camera film and synchronously illuminating the miscroscope at predetermined intervals, said mechanism being adjustable to permit the height of the camera table to be varied and said optical bench being mechanically isolated from the camera unit to prevent the transfer of vibrations.

4. In micro-cinematographic apparatus, a camera, a unit adapted to support the same at various heights, an optical bench comprising means adapted to support a microscope and a source of illumination therefor, said means comprising longitudinally and transversely movable members whereby said microscope may be moved with respect to the camera and mechanism for illuminating the microscope at predetermined intervals, said optical bench being mechanically isolated from the camera unit to prevent the transfer of vibrations.

5. In micro-cinematographic apparatus, a camera, observation and focusing pieces associated with said camera and mounted therewith on a movable member, a unit adapted to support said member at various heights, an optical bench comprising means adapted to support a microscope and a source of illumination therefor, said member being movable so that either of said pieces of the camera may be positioned over the microscope, said means comprising longitudinally and transversely movable members whereby said microscope may be moved with respect to the camera, and mechanism for illuminating the microscope at predetermined intervals, said optical bench being mechanically isolated from the camera unit to prevent the transfer of vibrations.

6. In micro-cinematographic apparatus, a camera, observation and focusing pieces associated with said camera and mounted therewith on a movable member, said member being mounted on a camera table, a unit adapted to support said table at various heights, an optical bench comprising means adapted to support a microscope and a source of illumination therefor, said member being movable on said table so that either of said pieces or the camera may be positioned over the microscope, said means comprising longitudinally and transversely movable members whereby said microscope may be moved with respect to the camera, mechanism mounted on said table for moving the camera film and synchronously illuminating the microscope at predetermined intervals, said mechanism being adjustable to permit the height of the camera table to be varied, and said optical bench being mechanically isolated from the camera unit to prevent the transfer of vibrations.

7. In micro-cinematographic apparatus, a camera, mechanism for intermittently moving the film therein, comprising, a driving motor, a camera shaft, a cam mounted thereon, a cam follower engaging said cam to prevent the camera shaft from rotating, means for illuminating the object being photographed during certain periods while said cam follower is disengaged and means for closing the circuit of the driving motor when the cam follower is disengaged from the cam.

In witness whereof, I have affixed my signature hereto.

HEINZ ROSENBERGER.